March 8, 1966
C. F. CHUBB ETAL
3,239,836
SIMPLIFIED MONOPULSE RADAR RECEIVER
Filed Feb. 28, 1961
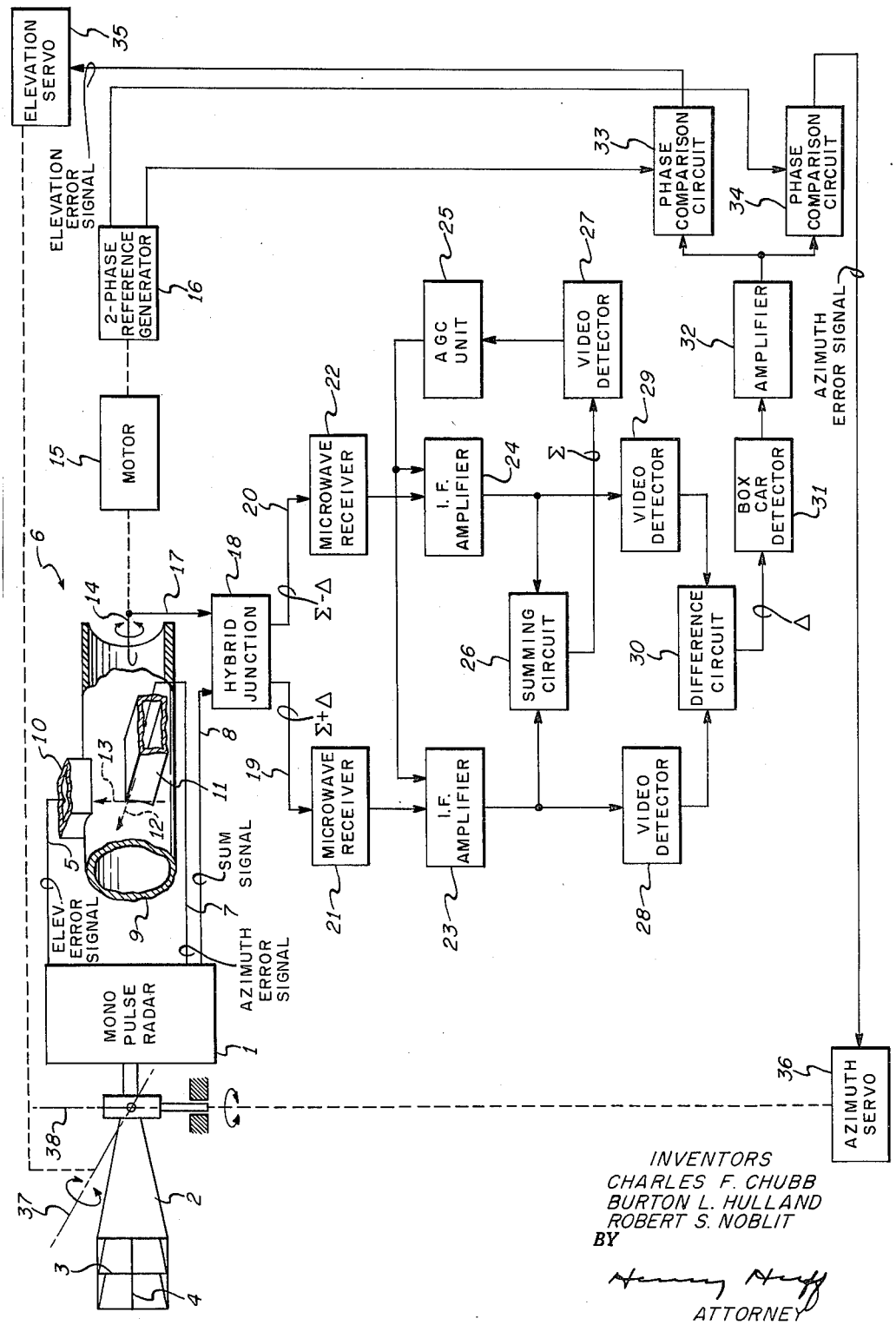
INVENTORS
CHARLES F. CHUBB
BURTON L. HULLAND
ROBERT S. NOBLIT
BY
*Henry Huff*
ATTORNEY United States Patent Office 3,239,836
Patented Mar. 8, 1966

3,239,836
SIMPLIFIED MONOPULSE RADAR RECEIVER
Charles F. Chubb, Glen Head, Burton L. Hulland, Glenwood Landing, and Robert S. Noblit, Cold Spring Harbor, N.Y., assignors to Sperry Rand Corporation, Great Neck, N.Y., a corporation of Delaware
Filed Feb. 28, 1961, Ser. No. 92,416
7 Claims. (Cl. 343—7.4)

The present invention generally relates to tracking radar apparatus and, more particularly, to a simplified receiver for use in a radar system of the monopulse type.

Target tracking radar systems may be categorized conveniently in terms of two different techniques for determining the angular position of a target. One technique is known as simultaneous lobing or monopulse where two or more beams simultaneously scan the target to determine target position. The more commonly used other technique is termed sequential lobing or conical scanning where a single beam is moved about an axis of rotation extending from the radar antenna in the direction of the target.

One of the important advantages of the monopulse technique attributable to its instantaneous determination of target position is the relative insensitivity to changes in ampliude of the target signal resulting from target reflectivity variations. If the target is a propeller-driven aircraft, for example, experience has shown that a substantial variation in target echo amplitude is encountered particularly when the propeller revolutions per minute approaches certain critical values. Such amplitude variations, however, are self-cancelling in the monopulse radar receiver whereby a residual tracking error signal is produced representing only target deviation from antenna boresight. On the other hand, the illustrative target signal amplitude variations would be indistinguishable in a conical scanning radar receiver from the true target deviation—from boresight—error signal. The resultant tendency for the conically scanning radar to "jitter" about the true target position in the presence of such echo signal fluctuations seriously detracts from the simplicity advantage of the conical scanning radar relative to the monopulse radar.

The inherent boresight stability characteristic of the monopulse radar cannot be fully exploited, however, without resort to relatively tedious, delicate and costly receiver design techniques. For example, each of the elevation and azimuth error signal channels in the receiver must be carefully stabilized against relative phase and gain drifts.

It is the principal object of the present invention to provide a simplified receiver for use in a tracking radar system of the monopulse type.

Another object of the present invention is to provide a simplified receiver for use in a tracking radar of the monopulse type, said receiver being characterized by a high order of insensitivity to echo signal fluctuations attributable to changes in target reflectivity.

An additional object is to provide a monopulse radar receiver which substantially eliminates the necessity for maintaining close signal phase and gain stabilization.

A further object is to provide a simplified monopulse radar receiver capable of producing a useful target tracking signal upon the occasion of a partial receiver failure.

These and other objects of the present invention, as will appear from a reading of the following specification, are accomplished in a preferred embodiment by the provision of a monopulse radar receiver including a conventional microwave signal comparator for producing the usual elevation error signal, azimuth error signal, and sum signal. The elevation and azimuth error signals are then sequentially sampled at a convenient rate. The sampled signals are combined with the sum signal to produce a pair of microwave signals, one resulting from the addition of the sum signal and the sampled signals and the other resulting from the subtraction of the sum signal and the sampled signals.

The two microwave signals are separately amplified and detected in respective receiver channels and then differentially combined to produce an output alternating signal. The output signal is then phase compared, respectively, with first and second reference signals generated in synchronism with the sampling of the elevation and azimuth error signals. As a result of the phase comparison, first and second control signals are generated for respectively actuating the elevation and the azimuth antenna orientation servos so as to align the antenna axis (boresight) with the target direction.

For a more complete understanding of the present invention, reference should be had to the following specification and to the sole figure which is a simplified block diagram, partly schematic in form, of a preferred embodiment. Referring to the figure, a conventional monopulse radar is represented by the numeral 1. Microwave energy generated by the transmitter included in radar 1 is radiated by four-quadrant horn 2. Radar 1 and horn 2 may be of the type disclosed in Patent 2,759,154, issued to P. G. Smith et al. on August 14, 1956, and assigned to the present assignee. Horn 2 is divided into four quadrant portions by septums 3 and 4. As described in the aforementioned patent, a comparator device included within radar 1 compares the relative magnitudes of the energy received above and below septum 4 and compares the relative amplitudes of the energy received on either side of septum 3. An error signal representing the relative amplitudes of the target echo energy received above and below septum 4 is applied by line 5 to a first input to microwave modulator or sampler 6. Similarly, an error signal representing the relative amplitudes of the target echo energy received on either side of septum 3 is directed by line 7 to a second input to microwave sampler 6. An additional output signal proportional to the sum of the target echo energy received in all four quadrant portions of horn 2 is produced on line 8.

In the illustrative embodiment, microwave sampler 6 comprises a section of circular waveguide 9 to which is coupled at right angles input rectangular waveguides 10 and 11. The target elevation error signal of line 5 is applied via waveguide 10 to circular guide 9. The target azimuth error signal of line 7 is applied to circular guide 9 via waveguide 11. The applied error signals introduced in guide 9 the perpendicularly directed signal components represented by the dashed vectors 12 and 13. A hook-shaped probe 14 is positioned at one end of guide 9 and is rotated about the axis of guide 9 by motor 15. Motor 15 also drives two phase reference generator 16 synchronously with the rotation of probe 14.

Probe 14 effectively samples the components of the error signal vectors 12 and 13 which lie in the direction of the plane of the hook. As probe 14 rotates, the signal vectors 12 and 13 are sampled in succession, for example, from the in-phase component of the elevation error signal, to the in-phase component of the azimuth error signal, to the out-of-phase component of the elevation error signal, to the out-of-phase component of the azimuth error signal. "In-phase" and "out-of-phase" refer to the relationship between the sum signal and the error signal components picked up by the rotating hook. From another point of view, it can be said that device 6 amplitude modulates the elevation error signal represented by vector 12 with a first modulating signal and amplitude modulates the azimuth error signal represented by vector 13 with a second modulating signal. The first and second modulating signals have the same frequency (determined by the frequency of rotation of probe 14) and bear a quadrature phase relationship with respect to each other (due to the perpendicular orientation of guides 10 and 11). A suitable microwave sampler is described in U.S. Patent 2,822,517, issued to S. B. Cohn on February 14, 1958, and assigned to the present assignee. Alternative microwave samplers will be apparent to those skilled in the art.

The sampled error signals are applied by microwave line 17 to a first input arm of hybrid junction 18. The target echo sum signal of microwave line 8 is applied to the other input arm of junction 18. The sampled error signals are added and subtracted from the sum signal in a conventional manner within junction 18. The two resultant signals, designated $\Sigma + \Delta$ and $\Sigma - \Delta$ are produced, respectively, on output microwave lines 19 and 20. The microwave signal component represented by the symbol $\Delta$ designates the particular sample of the elevation and azimuth error signals which is being picked up at a particular moment by the rotating probe 14.

It should be noted that the relative amplitudes of the resultant signals $\Sigma + \Delta$ and $\Sigma - \Delta$ will be determined by the sense of the target angular deviation from the boresight of horn 2. Depending upon the angular position of the target relative to the boresight axis of horn 2, the amplitude of either of the resultant signals may be greater than the amplitude of the other resultant signal. The resultant signals $\Sigma + \Delta$ and $\Sigma - \Delta$ are respectively applied to microwave receivers 21 and 22. Receivers 21 and 22 include the usual signal mixers and preamplifiers. The receiver output signals are respectively applied to IF amplifiers 23 and 24 whose gains are controllable in response to a signal derived from AGC unit 25. The output signals of amplifiers 23 and 24 are additively combined in summing circuit 26 and applied to video detector 27. The signal summing process eliminates the signal component $\Delta$ to produce a video signal $\Sigma$ which is substantially equivalent in signal-to-noise ratio to a conventional monopulse range channel video signal. The resultant signal is detected in video detector 27 and applied to AGC unit 25 to control the gains of IF amplifiers 23 and 24. Alternatively, each of IF amplifiers 23 and 24 can be provided with its own separate AGC unit so that its average output is maintained as closely as desired to a given value.

The output signals from amplifiers 23 and 24 are also applied to video detectors 28 and 29, respectively. The video signal outputs of detectors 28 and 29 are differentially combined in difference circuit 30. The sum signal component $\Sigma$ is cancelled out in circuit 30 leaving only the difference component $\Delta$. The signal component $\Delta$ is applied to conventional boxcar detector 31 to produce an alternating signal having a frequency determined by the speed of rotation of probe 14 and an amplitude representing the amount of target deviation from antenna boresight. The alternating signal output of detector 31 is amplified in amplifier 32 and jointly applied to the first input terminals of phase comparison circuits 33 and 34. The specific structural identity of circuits 33 and 34 is not of particular significance. All that is required is that each circuit produce an output signal having a characteristic representing the difference in phase between the two input signals respectively applied thereto. For example, conventional phase detectors may be employed. The two phase quadrature reference voltages produced by generator 16 are respectively applied to second input terminals of phase detectors 33 and 34. In this manner, the alternating signal at the output of detector 31 is suitably demodulated into two separate output or control signals for the positioning of horn 2. The signal at the output of circuit 33 is applied as an elevation control signal to elevation servo 35. Similarly, the signal at the output of circuit 34 is applied as an azimuth control signal to azimuth servo 36. Elevation servo 35 positions horn 2 about horizontal axis 37; servo 36 positions horn 2 about vertical axis 38.

In typical servo fashion, horn 2 will be positioned about axes 37 and 38 in directions which reduce the error signal outputs of circuits 33 and 34 to a null at which time the antenna boresight axis will intersect the target. Those skilled in the art will recognize the similarity of the operation of circuits 33 and 34 and servos 35 and 36 with respect to the operation of the corresponding antenna orientation apparatus used in a conventional conically scanning radar. It should be observed, however, that the input signal jointly applied to circuits 33 and 34 is a true monopulse signal which carries precise target positional data resulting from an instantaneous sampling of target position as opposed to the approximate data resulting from the time sequential sampling of target position as in a conically scanning system.

Thus, the target tracking advantages of a monopulse radar over a conically scanning radar also obtain in the apparatus of the present invention. For example, target signal amplitude variations attributable to target reflectivity changes are substantially ignored by the present system. Conically scanning radars, on the other hand, are well known to be highly sensitive to the aforesaid changes in target reflectivity especially where the frequency of the target amplitude variations approach the nutation frequency of the conically scanning antenna.

The above-mentioned insensitivity to target reflectivity variations is also shared by conventional monopulse radars but only at the expense of considerable complexity relative to the apparatus of the present invention. In a conventional monopulse radar, the elevation and azimuth error signals and the sum signals are separately amplified and detected in respective signal channels prior to the point where they are combined with the sum signals to produce signals for positioning the antenna boresight axis. The respective signal channels of the prior art monopulse radar receivers are susceptible to signal phasing variations whereby the relative phase of the error and sum signals prior to combination may change for reasons other than a change in target position with respect to the antenna boresight axis. The consequence is that unless extensive provisions are made to maintain predetermined and constant signal phase shifts in each of the respective signal channels, the effective boresight axis is subject to shift. In accordance with the present invention, on the other hand, the error signals and the sum signal are combined at microwave frequencies in hybrid junction 18 prior to application to the signal amplification and detection channels 21, 23, 28 and 22, 24, 29. As a result, the variations in signal phase shift through the aforesaid two signal channels will have no measurable effect on the position of the effective antenna boresight axis.

Additionally, it is not necessary that the gain of the signal channels be equalized as is the case with conventional monopulse radar signal processing channels. The need for the relatively elaborate pilot pulse AGC technique referred to in the above-mentioned patent to P. G. Smith et al. is eliminated. Any gain differences in the two signal channels will result in unequal sum signal cancellation. This will produce an inconsequential direct current component at the output of detector 31 which will be rejected by amplifier 32. It should also be noted that useful antenna positioning signals are generated by the apparatus of the present invention despite the failure of either one of the signal channels 21, 23, 28 and 22, 24, 29. Upon the failure of either one of said channels, the remaining system will still operate effectively with relatively small deterioration in target tracking performance.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus comprising a radar of the simultaneous lobing type, said radar transmitting a positionable directive beam of electromagnetic energy and producing first and second microwave target echo signals of the same frequency, said first echo signal having an amplitude representing the deviation of the target from the directive axis of said beam and having a phase relative to said second echo signal representing the sense of said deviation, a microwave modulator for amplitude modulating said first echo signal at a predetermined frequency, a hybrid junction having first and second inputs, said first input being connected to the output of said microwave modulator, said second echo signal being applied to said second input, said hybrid junction producing first and second output signals respectively representing the sum of and the difference between the microwave signals applied to respective ones of said inputs, a pair of detectors, means for applying said first output signal to one of said detectors, means for applying said second output signal to the other of said detectors, means connected to both said detectors for differentially combining the signals produced at the respective outputs thereof, a phase comparison circuit having first and second inputs, said first input being connected to the output of said means for differentially combining, a source of alternating signals having said predetermined frequency connected to said second input, and means for positioning said directive beam, the output of said phase comparison circuit being coupled to said last-named means.

2. Apparatus comprising a radar of the simultaneous lobing type having a positionable antenna, said radar producing first and second microwave target echo signals of the same frequency, said first echo signal having an amplitude representing the deviation of the target from the boresight of said antenna and having a phase relative to said second echo signal representing the sense of said deviation, a microwave modulator for amplitude modulating said first echo signal at a predetermined frequency, a hybrid junction having first and second inputs, said first input being connected to the output of said modulator, said second echo signal being applied to said second input, said hybrid junction producing first and second output signals respectively representing the sum of and the difference between the microwave signals applied to respective ones of said inputs, a pair of detectors, means for applying said first output signal to one of said detectors, means for applying said second output signal to the other of said detectors, means connected to both said detectors for differentially combining the signals produced at the respective outputs thereof, a phase comparison circuit having first and second input terminals, one of said terminals being connected to the output of said means for differentially combining, a source of alternating signals having said predetermined frequency connected to the other of said input terminals, and servo means for positioning said antenna, the output of said phase comparison circuit being coupled to said servo means.

3. Apparatus comprising a radar of the monopulse type, said radar having a positionable antenna and producing first and second microwave target echo signals of the same frequency, said first echo signal having an amplitude representing the deviation of the target from the boresight of said antenna and having a phase relative to said second echo signal representing the sense of said deviation, a microwave, modulator for amplitude modulating said first echo signal at a predetermined frequency, a hybrid junction having first and second input arms, said first arm being connected to the output of said microwave modulator, said second echo signal being applied to said second arm, said hybrid junction producing first and second output signals respectively representing the sum of and the difference between the microwave signals applied to respective ones of said input arms, a pair of controllable gain amplifiers, said first and second output signals being applied to the inputs of respective ones of said amplifiers, a pair of detectors connected to the outputs of respective ones of said amplifiers, means connected to both said detectors for differentially combining the signals produced at the respective outputs thereof, a phase comparison circuit having first and second inputs, said first input being connected to the output of said means for differentially combining, a source of alternating signals having said predetermined frequency connected to said second input, and servo means for positioning said antenna, the output of said phase comparison circuit being connected to said servo means.

4. Apparatus as defined in claim 3 and further including means connected to both said amplifiers for additively combining the signals produced at the respective outputs thereof, and circuit means including a detector for producing a gain control signal, said circuit means being connected to the output of said means for additively combining, said gain control signal being applied to both said controllable gain amplifiers.

5. Apparatus comprising a radar of the simultaneous lobing type having an antenna positionable about two perpendicular axes, said radar producing first, second and third microwave target echo signals of the same frequency, said first echo signal having an amplitude representing the deviation of the target about one of said axes and having a phase relative to said third echo signal representing the sense of said deviation, said second echo signal having an amplitude representing the deviation of the target about the other of said axes and having a phase relative to said third echo signal representing the sense of said deviation, a microwave modulator for respectively amplitude modulating said first and second echo signals with first and second modulating signals, said modulating signals having a predetermined frequency and bearing a quadrature phase relationship relative to each other, a hybrid junction having first and second inputs, the amplitude modulated signals at the output of said microwave modulator being applied to said first input, said third echo signal being applied to said second input, said hybrid junction producing first and second output signals representing the sum of and the difference between the microwave signals applied to respective ones of said inputs, a pair of detectors, means for applying said first output signal to one of said detectors, means for applying said second output signal to the other of said detectors, means connected to both said detectors for differentially combining the signals produced at the respective outputs thereof, a pair of phase comparison circuits each having first and second inputs, said first inputs of both said phase comparison circuits being connected to the output of said means for differentially combining, a source of first and second alternating signals having the same frequency and phase relationship relative to each other as said first and second modulating signals, one of said alternating signals being applied to the second input of one of said phase comparison circuits, the other of said alternating signals being applied to the second input of the other of said phase comparison circuits, and a pair of means for positioning said antenna about respective ones of said perpendicular axes, the output of one of said phase comparison circuits being coupled to one of said last-named means and the output of the other of said phase comparison circuits being coupled to the other of said last-named means.

6. Apparatus comprising a radar of the monopulse type having an antenna positionable about two perpendicular axes, said radar producing first, second and third microwave target echo signals of the same frequency, said first echo signal having an amplitude representing the deviation of the target about one of said axes and having a phase relative to said third echo signal representing the sense of said deviation, said second echo signal having an amplitude representing the deviation of the target about the other of said axes and having a phase relative to said third echo signal representing the sense of said deviation, a microwave modulator for respectively amplitude modulating said first and second echo signals with first and second modulating signals, said modulating signals having a predetermined frequency and bearing a quadrature phase relationship relative to each other, a hybrid junction having first and second inputs, the amplitude modulated signals at the output of said microwave modulator being applied to said first input, said third echo signal being applied to said second input, said hybrid junction producing first and second output signals representing the sum of and the difference between the microwave signals applied to respective ones of said inputs, a pair of controllable gain amplifiers, said first and second output signals being applied to the inputs of respective ones of said amplifiers, a pair of detectors connected to the outputs of respective ones of said amplifiers, means connected to both said detectors for differentially combining the signals produced at the respective outputs thereof, a pair of phase comparison circuits each having first and second inputs, said first input of both said phase comparison circuits being connected to the output of said means for differentially combining, a source of first and second alternating signals having the same frequency and phase relationship relative to each other as said first and second modulating signals, one of said alternating signals being applied to the second input of one of said phase comparison circuits, the other of said alternating signals being applied to the second input of the other of said phase comparison circuits, and a pair of means for positioning said antenna about respective ones of said perpendicular axes, the output of one of said phase comparison circuits being coupled to one of said last-named means and the output of the other of said phase comparison circuits being coupled to the other of said last-named means.

7. Apparatus as defined in claim 6 and further including means connected to both said amplifiers for additively combining the signals produced at the respective outputs thereof, and circuit means including a detector for producing a gain control signal, said circuit means being connected to the output of said means for additively combining, said gain control signal being applied to both said controllable gain amplifiers.

References Cited by the Examiner

UNITED STATES PATENTS

| | | | |
|---|---|---|---|
| 2,480,829 | 9/1949 | Barrow et al. | 343—16.1 |
| 2,821,701 | 1/1958 | Vogeley et al. | 343—7.4 |

CHESTER L. JUSTUS, *Primary Examiner*.